United States Patent
Zou et al.

(10) Patent No.: US 9,172,099 B2
(45) Date of Patent: Oct. 27, 2015

(54) NANO-FIBERS FOR ELECTRICAL POWER GENERATION

(75) Inventors: Lijun Zou, Rochester, NY (US);
Timothy J. Fuller, Pittsford, NY (US);
Michael R. Schoeneweiss, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 13/285,296

(22) Filed: Oct. 31, 2011

(65) Prior Publication Data
US 2012/0122011 A1     May 17, 2012

Related U.S. Application Data

(60) Provisional application No. 61/413,688, filed on Nov. 15, 2010.

(51) Int. Cl.
| | |
|---|---|
| *H01M 2/16* | (2006.01) |
| *H01M 8/02* | (2006.01) |
| *H01M 8/10* | (2006.01) |
| *C08J 5/22* | (2006.01) |
| *D01D 5/00* | (2006.01) |
| *D01F 6/74* | (2006.01) |
| *D01F 6/78* | (2006.01) |

(52) U.S. Cl.
CPC ............ *H01M 8/0291* (2013.01); *C08J 5/2206* (2013.01); *C08J 5/2262* (2013.01); *D01D 5/0084* (2013.01); *D01F 6/74* (2013.01); *D01F 6/78* (2013.01); *H01M 2/1653* (2013.01); *H01M 8/0239* (2013.01); *H01M 8/1018* (2013.01); *C08J 2371/12* (2013.01); *Y02E 60/521* (2013.01)

(58) Field of Classification Search
CPC .......................... H01M 2/1653; H01M 8/0239
USPC .................................................. 429/479, 249
See application file for complete search history.

(56) References Cited

U.S. PATENT DOCUMENTS

| | | | |
|---|---|---|---|
| 5,006,408 A | 4/1991 | Green et al. | |
| 8,053,530 B2 | 11/2011 | Fuller et al. | |
| 2002/0100725 A1 | 8/2002 | Lee et al. | |
| 2007/0099054 A1 | 5/2007 | Fuller et al. | |
| 2008/0027152 A1 | 1/2008 | Maier et al. | |
| 2009/0278083 A1* | 11/2009 | Fuller et al. ................ | 252/182.1 |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |
| 2010/0227247 A1 | 9/2010 | Pintauro et al. | |
| 2010/0233523 A1 | 9/2010 | Jo et al. | |
| 2010/0304205 A1* | 12/2010 | Jo et al. ......................... | 429/144 |
| 2011/0318642 A1* | 12/2011 | Nishiyama et al. ........ | 429/231.8 |

FOREIGN PATENT DOCUMENTS

| | | |
|---|---|---|
| CN | 101629003 A | 1/2010 |
| DE | 10 2009 020 232 A1 | 2/2010 |

* cited by examiner

*Primary Examiner* — Cynthia H Kelly
*Assistant Examiner* — Monique Wills
(74) *Attorney, Agent, or Firm* — Brooks Kushman P.C.

(57) ABSTRACT

A fibrous sheet for fuel cell or battery applications is formed by electrospinning a fluorinated ion-conducting polymer solution to form an agglomeration of fibers.

20 Claims, 4 Drawing Sheets

NANO-FIBERS FOR ELECTRICAL POWER GENERATION

CROSS-REFERENCE TO RELATED APPLICATIONS

This application claims the benefit of U.S. provisional Application No. 61/413,688, filed Nov. 15, 2010, the disclosure of which is incorporated in its entirety by reference herein.

FIELD OF THE INVENTION

The present invention relates to methods for making fuel cell membranes, gas diffusion media, fuel cell electrodes, and battery separators.

BACKGROUND OF THE INVENTION

In battery applications, porous sheets are used as separators. Battery separators are porous sheets that are interposed between an anode and cathode in a fluid electrolyte. For example, in lithium ion batteries, lithium ions ($Li^+$) move from the anode to the cathode during discharge. The battery separator acts to prevent physical contact between the electrodes while allowing ions to be transported. Typical prior art separators include microporous membranes and mats made from nonwoven cloth. Battery separators are ideally inert to the electrochemical reactions that occur in batteries. Therefore, various polymers have been used to form battery separators.

In the case of fuel cells, porous sheets are used as gas diffusion layers and supports for polyelectrolyte membranes. Gas diffusion layers play a multifunctional role in proton exchange membrane fuel cells. For example, gas diffusion layers act as diffusers for reactant gases traveling to the anode and the cathode layers while transporting product water to the flow field. Gas diffusion layers also conduct electrons and transfer heat generated at the membrane electrode assembly to the coolant, and act as a buffer layer between the soft membrane electrode assembly and the stiff bipolar plates. Although the present technologies for making gas diffusion layers for fuel cell applications work reasonably well, improvement in properties and cost are still desirable.

Accordingly, there is a need for improved methods for forming fuel cell membranes, diffusion media, fuel cell electrodes and battery separators.

SUMMARY OF THE INVENTION

The present invention solves one or more problems of the prior art by providing in at least one embodiment a method of forming a fibrous sheet that is useful in battery and in fuel cell applications. The method of this embodiment includes a step of providing a solution comprising a fluorinated cyclobutane polymer. The solution is electrospun onto a substrate to form a fibrous coating over a surface of the substrate. The fibrous coating is then formed into a fuel cell membrane, gas diffusion media, fuel cell electrode, or a battery separator. Electrospun polyelectrolyte nano-fibers can be created as a three-dimensional interconnected network along with a second phase in the system with improved mechanical properties. The polymer coatings can be prepared with controlled thickness and morphology by an industrially scalable process. The process can be used to make supports, polyelectrolyte membranes, diffusion media and novel catalysts for fuel cells and to make battery separators as well.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1A:
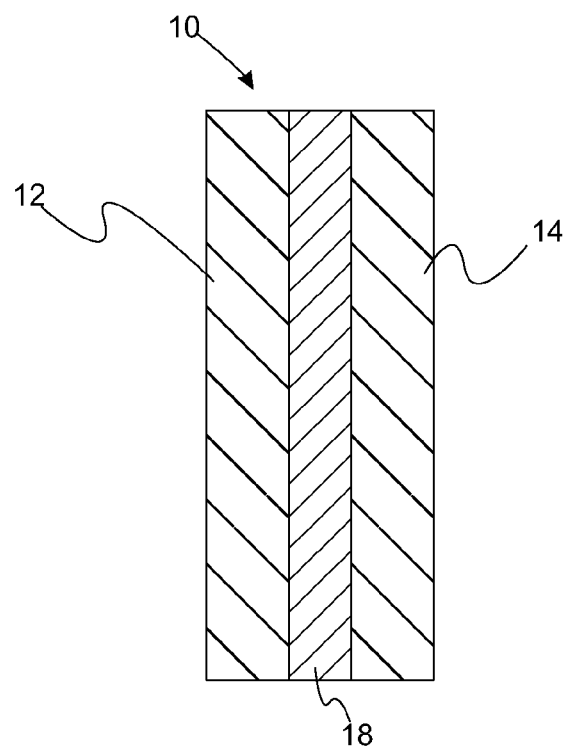
FIG. 1A provides a schematic illustration of a battery system incorporating a separator.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1A, a schematic cross section of a battery assembly incorporating an embodiment of a fibrous sheet is provided. Battery 10 includes anode 12 and cathode 14. Separator 18 is interposed between anode 12 and cathode 14 thereby minimizing electrical shorts between the two electrodes while allowing passages of ions such as lithium ($Li^+$). Advantageously, separator 18 is made by a variation of the process set forth below.

Figure 1B:
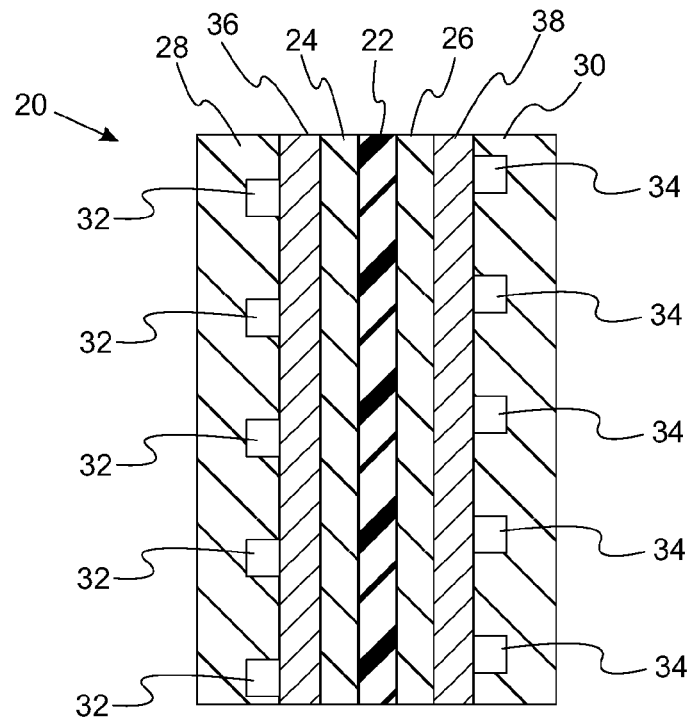
FIG. 1B provides a schematic illustration of a fuel cell incorporating a separator.

With reference to FIG. 1B, a schematic cross section of a fuel cell that incorporates an embodiment of a fibrous sheet is provided. PEM fuel cell 20 includes polymeric ion conducting membrane 22 disposed between cathode catalyst layer 24 and anode catalyst layer 26. Fuel cell 20 also includes bipolar electrically conductive plates 28 and 30, gas channels 32 and 34, and gas diffusion layers 36 and 38. Advantageously, diffusion layers 36 and 38 are made by a variation of the process set forth below. The membrane 22 may comprise a support made by a variation of the process set forth below with either a perfluorocyclobutane polymer with or without proton conducting ionic groups. The catalyst layers 24 and 26 may be made with electrospun fibers by incorporating platinum on carbon black catalysts directly into, for example, fluorinated cyclobutane polymers with pendant side-chain and main-chain sulfonation groups.

Figure 2:
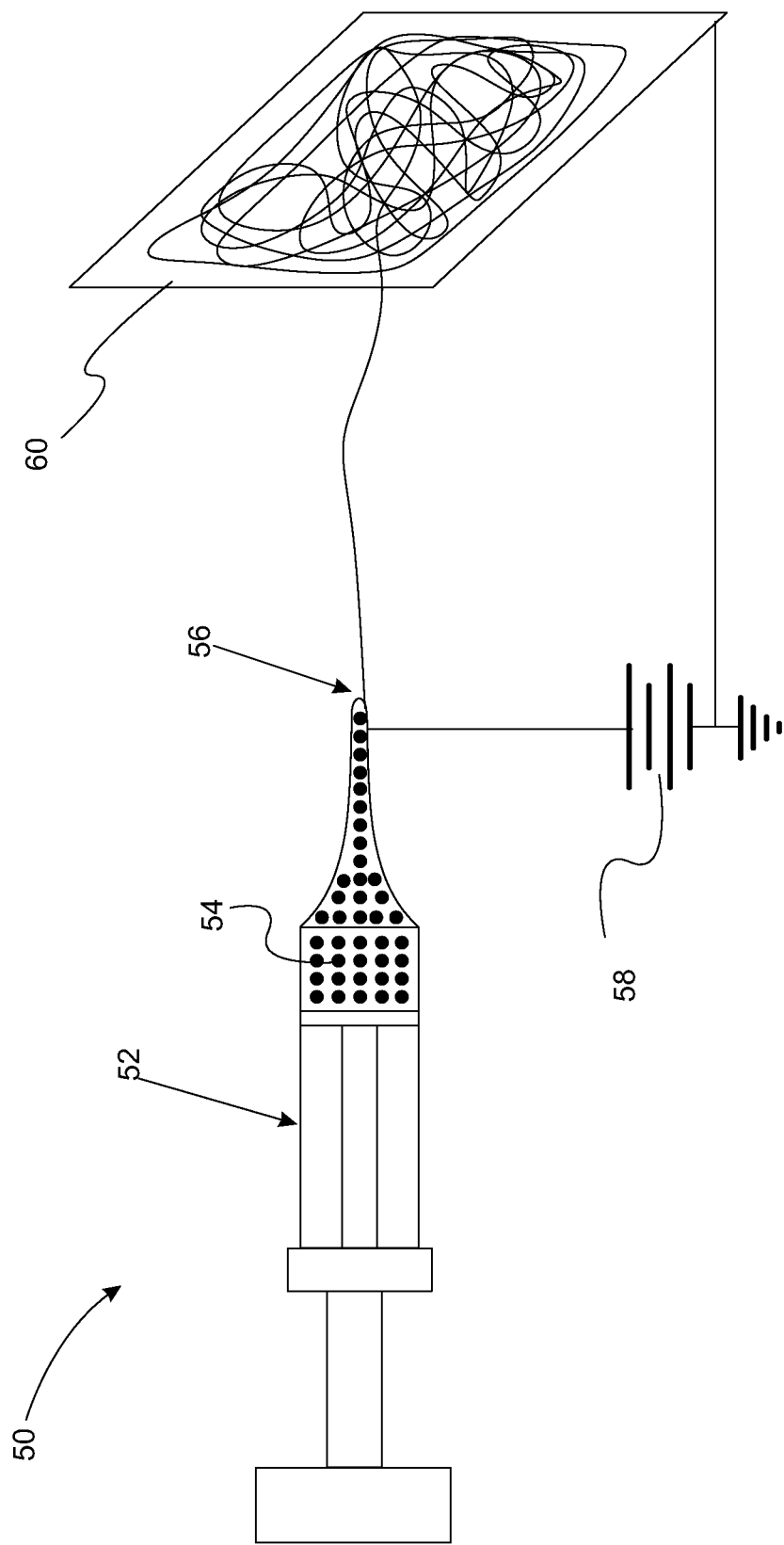
FIG. 2 is a schematic of an electrospinning apparatus used to form a fibrous sheet for fuel cell or battery applications.

With reference to FIG. 2, a schematic of an electrospinning apparatus used to form a fibrous sheet for fuel cell or battery applications is provided. Electrospinning apparatus 50 includes a syringe 52 which contains fluorinated ion-conducting polymer solution 54. Droplets emerge from the syringe at position 56. Voltage supply 58 is used to provide a voltage to the emerging droplets. The droplets stretch and ultimately form into fibers, and preferably a continuous fiber. Typically, the fibers will have diameters of nano-sized dimensions. The fibers are collected onto the grounded collector 60 (a substrate).

Figure 3:
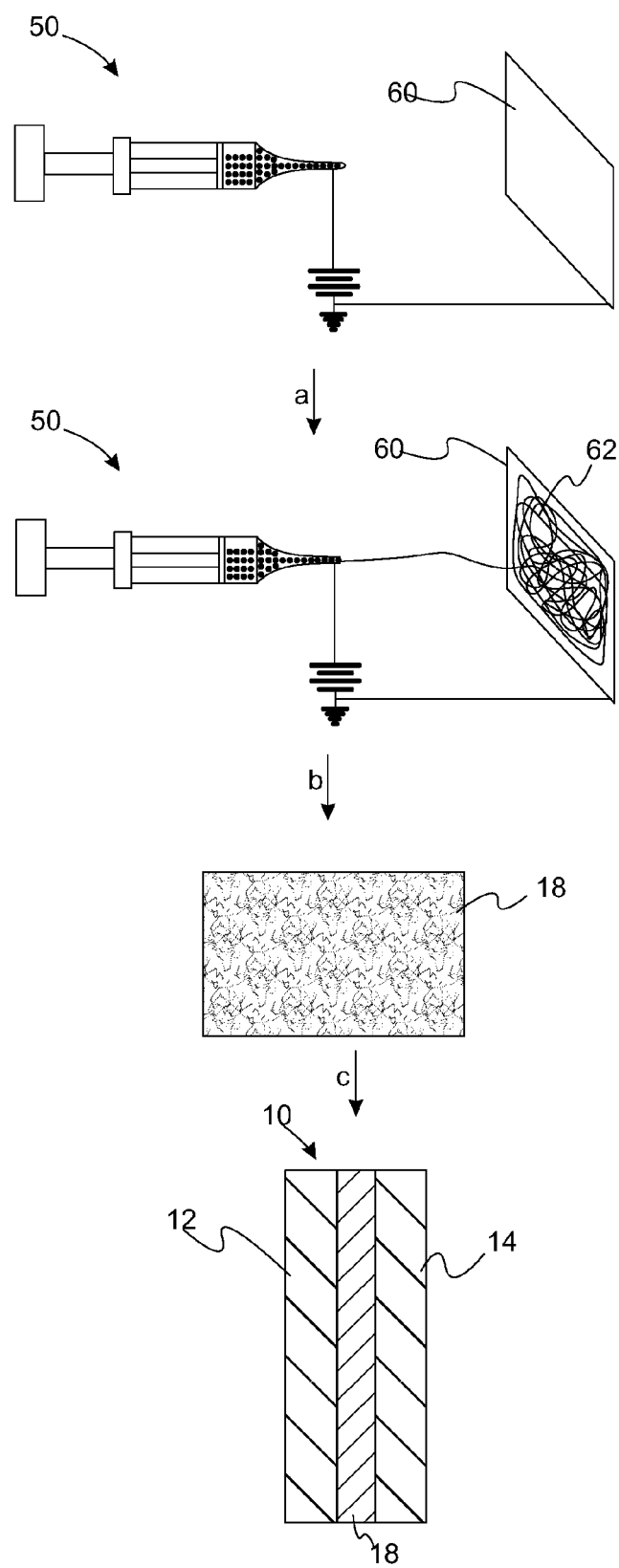
FIG. 3 is a schematic flowchart illustrating a method of forming a fibrous sheet to be integrated into a battery.

With reference to FIG. 3, a schematic flowchart illustrating a method of forming a fibrous sheet to be integrated into a battery is provided. In step a), electrospinning apparatus 50 is used to form fiber aggregation 62 on substrate 60. In step b), fibrous aggregation 62 is separated from substrate 60 then formed into a fibrous sheet from which battery separator 18 is made. In step c), battery separator 18 is then integrated into battery 10. In a refinement, the fibrous sheet has a thickness from about 5 microns to about 2 mm. In another refinement, the fibers have an average width from about 5 nanometers to about 10 microns. In still another refinement, the fibers have an average width from about 10 nanometers to about 5 microns.

Figure 4:
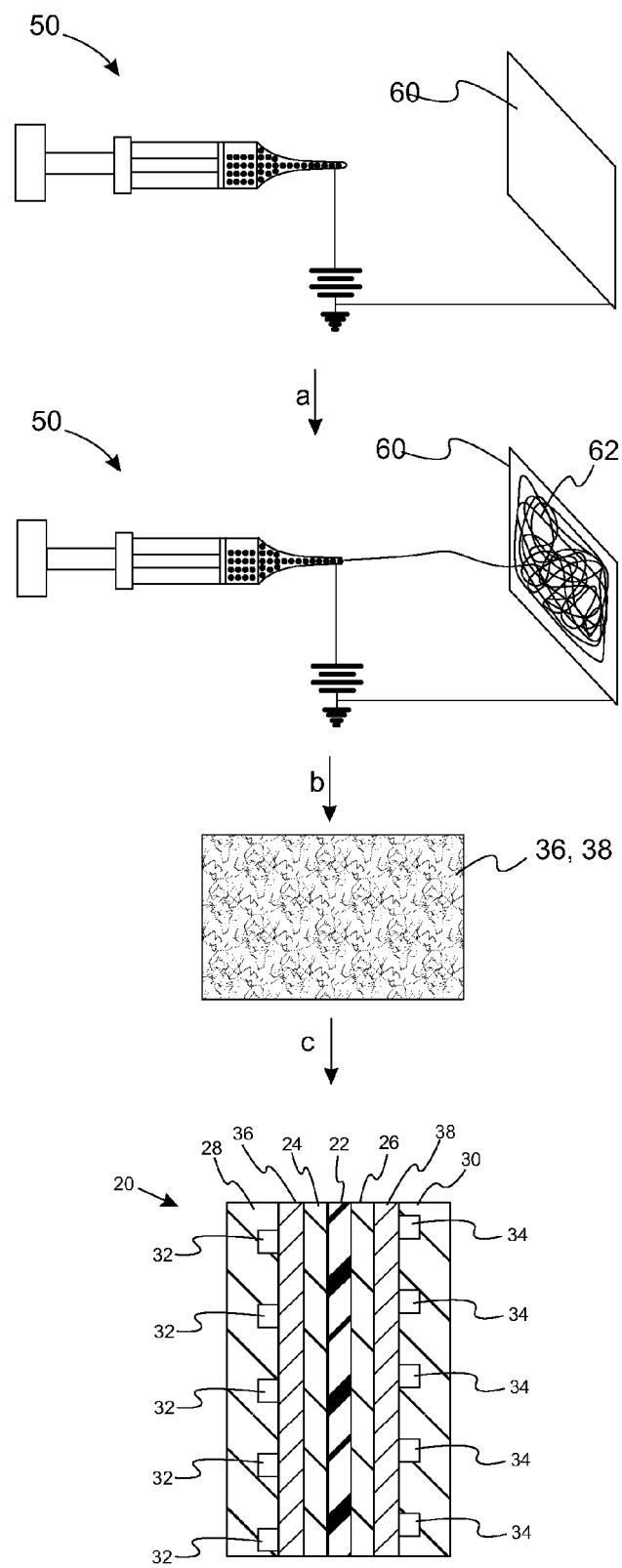
FIG. 4 is a schematic flowchart illustrating a method of forming a fibrous sheet to be integrated into a fuel cell.

With reference to FIG. 4, a schematic flowchart illustrating a method of forming a fibrous sheet to be integrated into a fuel cell is provided. In step a), electrospinning apparatus 50 is used to form fiber aggregation 62 on substrate 60. In step b), fibrous aggregation 62 is separated from substrate 60 then formed into a fibrous sheet from which gas diffusion layers 36, 38 are made. In step c), gas diffusion layers 36 and 38 are then integrated into fuel cell 20.

In a variation of the present invention, non-ionomeric perfluorocyclobutane polymers alone, poly(perfluorocyclobutane) ionomers alone, or with rubber blends or with polysulfones and perfluorosulfonic acid polymers and the like, are electrospun onto different substrates along with additives like chemical mitigants (e.g., $CeO_2$, $MnO_2$, or cobalt tetramethoxyphenylporphyrin), catalysts (e.g., platinum on carbon) or catalyst precursors (e.g., platinum complexes). The morphology of ionomers can be controlled as nano-fibers, and different additives can be coated simultaneously onto those nano-fibers.

In another variation, polymer solution includes a polymer selected from the group consisting of Nafion™, polyvinylidene fluoride, sulfonated perfluorocyclobutanes, and combinations thereof. In a refinement, the polymers are blended with other material such as rubbers, fluoroelastomers, and the like.

In a variation of the present invention, the fibrous sheet is formed from an ion-conducting polymer having perfluorocyclobutyl (PFCB) moieties. Suitable polymers having cyclobutyl moieties are disclosed in U.S. Pat. Pub. No. 2007/0099054, U.S. Pat. Nos. 7,897,691 issued Mar. 1, 2011; 7,897,692 issued Mar. 1, 2011; 7,888,433 issued Feb. 15, 2011, 7,897,693 issued Mar. 1, 2011; and U.S. Pat. Pub. No. 2011/0053036, the entire disclosures of which are hereby incorporated by reference. The present invention also embraces sulfonated and unsulfonated ion-conducting polymers having perfluorocyclobutyl moieties. Such polymers are sometime referred to as sulfonated or unsulfonated PFCBs. In a variation, the ion-conducting polymer has a polymer segment comprising polymer segment 1:

$$E_0\text{-}P_1\text{-}Q_1\text{-}P_2 \qquad\qquad 1$$

wherein:

$E_o$ is a moiety that optionally has a protogenic group such as —$SO_2X$, —$PO_3H_2$, —COX, and the like;

$P_1$, $P_2$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

X is an —OH, a halogen, an ester, or

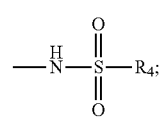

$R_4$ is trifluoromethyl, $C_{1-25}$ alkyl, $C_{1-25}$ perfluoroalkylene, $C_{1-25}$ aryl, or $E_1$ (see below); and $Q_1$ is a fluorinated cyclobutyl moiety.

In a variation of the present invention, the ion-conducting polymer comprises polymer segments 2 and 3:

$$[E_1(Z_1)_d]\text{-}P_1\text{-}Q_1\text{-}P_2 \qquad\qquad 2$$

$$E_2\text{-}P_3\text{-}Q_2\text{-}P_4 \qquad\qquad 3$$

wherein:

$Z_1$ is absent or a protogenic group such as —$SO_2X$, —$PO_3H_2$, —COX, and the like;

$E_1$ is an aromatic containing moiety;

$E_2$ is an unsulfonated aromatic-containing and/or aliphatic-containing moiety;

X is an —OH, a halogen, an ester, or

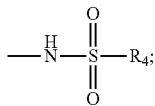

d is the number of $Z_1$ attached to $E_1$;

$P_1$, $P_2$, $P_3$, $P_4$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

In one refinement, d is equal to the number of aromatic rings in $E_1$. In another refinement, each aromatic ring in $E_1$ can have 0, 1, 2, 3, or 4 $Z_1$ groups.

In another variation of the present embodiment, the ion-conducting polymer comprises segments 4 and 5:

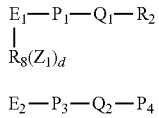

wherein:

$Z_1$ is absent or a protogenic group such as —$SO_2X$, —$PO_3H_2$, —COX, and the like;

$E_1$, $E_2$ are each independently an aromatic-containing and/or aliphatic-containing moiety;

X is an —OH, a halogen, an ester, or

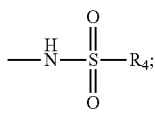

d is the number of $Z_1$ attached to $R_8$;

$P_1$, $P_2$, $P_3$, $P_4$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

In a refinement of this variation, $R_8$ is $C_{1-25}$ alkylene, $C_{1-25}$ perfluoroalkylene, perfluoroalkyl ether, alkylether, or $C_{1-25}$ arylene. In one refinement, d is equal to the number of aromatic rings in $R_8$. In another refinement, each aromatic ring in $R_8$ can have 0, 1, 2, 3, or 4 $Z_1$ groups. In still another refinement, d is an integer from 1 to 4 on average.

In another variation of the present embodiment, the ion-conducting polymer comprises polymer segments 6 and 7:

$$E_1(SO_2X)_d\text{-}P_1\text{-}Q_1\text{-}P_2 \qquad (6)$$

$$E_2\text{-}P_3\text{-}Q_2\text{-}P_4 \qquad (7)$$

connected by a linking group $L_1$ to form polymer units 8 and 9:

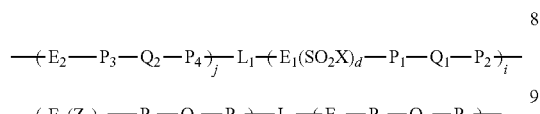

wherein:

$Z_1$ is absent or a protogenic group such as —$SO_2X$, —$PO_3H_2$, —COX, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

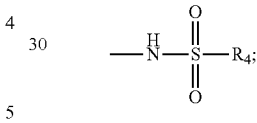

d is a number of $Z_1$ functional groups attached to $E_1$;

$P_1$, $P_2$, $P_3$, $P_4$ are each independently absent, —O—, —S—, —SO—, —$SO_2$—, —CO—, —NH—, $NR_2$—, —$R_3$—, and $R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 6 with i typically being from 1 to 200; and j is a number representing the repetition of a polymer segment 7 with j typically being from 1 to 200. In one refinement, d is equal to the number of aromatic rings in $E_1$. In another refinement, each aromatic ring in $E_1$ can have 0, 1, 2, 3, or 4 $Z_1$ groups.

In still another variation of the present embodiment, the ion-conducting polymer comprises polymer segments 10 and 11:

$$E_1(Z_1)_d\text{-}P_1\text{-}Q_1\text{-}P_2 \qquad (10)$$

$$E_2(Z_1)_f\text{-}P_3 \qquad (11)$$

wherein:

$Z_1$ is absent or a protogenic group such as —$SO_2X$, —$PO_3H_2$, —COX, and the like;

$E_1$, $E_2$ are each independently an aromatic or aliphatic-containing moiety wherein at least one of $E_1$ and $E_2$ includes an aromatic containing moiety substituted with $Z_1$;

X is an —OH, a halogen, an ester, or

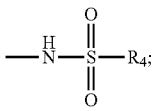

d is the number of $Z_1$ functional groups attached to $E_1$;
f is the number of $Z_1$ functional groups attached to $E_2$;
$P_1$, $P_2$, $P_3$ are each independently absent, —O—, —S—, —SO—, —SO$_2$—, —CO—, —NH—, NR$_2$—, or —R$_3$—;
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero, d is zero. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average. In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average. In a variation, polymer segments 10 and 11 are each independently repeated 1 to 10,000 times to form respective polymer blocks that may be joined with a linking group $L_1$ shown below.

In another variation of the present embodiment, the ion-conducting polymer comprises:

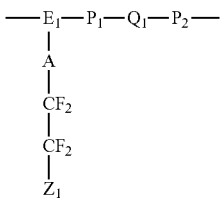

wherein:
$Z_1$ is hydrogen or a protogenic group such as —SO$_2$X, —PO$_3$H$_2$, —COX, and the like;
$E_1$ is an aromatic containing moiety;
A is absent or oxygen (O) or a chain extender having a carbon backbone;
X is an —OH, a halogen, an ester, or

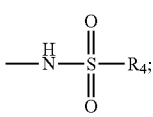

$P_1$, $P_2$ are each independently absent, —O—, —S—, —SO—, —SO$_2$—, —CO—, —NH—, NR$_2$—, or —R$_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety.

In a variation of the present embodiment, polymer segment 12 is repeated j times to form a polymer block described by formula 13.

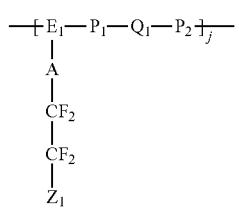

13

In a refinement, j is from about 1 to 10,000. In another refinement, j is from about 2 to about 100. In another refinement, j is from about 3 to about 50. In still another refinement, j is from about 4 to about 40.

In a variation of the present invention, the polymer having polymer segment 1 includes a second polymer segment having formula 14:

$$E_2\text{-}P_3\text{-}Q_2\text{-}P_4 \qquad 14$$

wherein:
$E_2$ is an aromatic containing moiety;
$P_3$, $P_4$ are each independently absent, —O—, —S—, —SO—, —SO$_2$—, —CO—, —NH—, NR$_2$—, or —R$_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_2$ group; and
$Q_2$ is a fluorinated cyclobutyl moiety.

In a refinement, polymer segment 14 is repeated k times to form polymer block 15:

15

In a refinement, k is from about 1 to about 10,000. In another refinement, k is from about 2 to about 100. In another refinement, k is from about 3 to about 50. In still another refinement, k is from about 4 to about 40.

In another variation, polymer blocks 13 and 15 are connected by a linking group $L_1$:

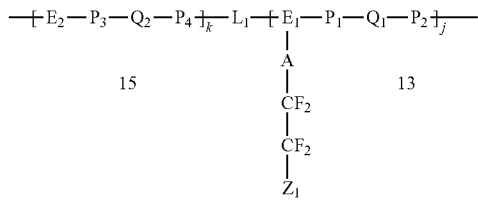

$$-\!\!\left[\!\!\begin{array}{c}E_1-P_1-Q_1-P_2\\ |\\ A\\ |\\ CF_2\\ |\\ CF_2\\ |\\ Z_1\end{array}\!\!\right]_{\!j}\!\!\!-\!L_1\!-\!\!\left[E_2-P_3-Q_2-P_4\right]_{\!k}\!\!-$$

13         15

In each of the formulae 1-15, $E_1$ and $E_2$ include one or more aromatic rings. For example, $E_1$ and $E_2$, include one or more of the following moieties:

Examples of $L_1$ include the following linking groups:

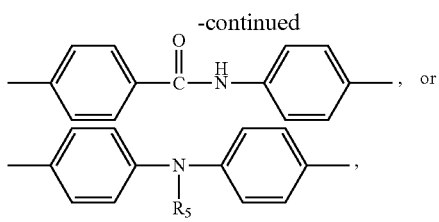

where $R_5$ is an organic group, such as an alkyl or acyl group.

Examples for $Q_1$ and $Q_2$ in the above formulae are:

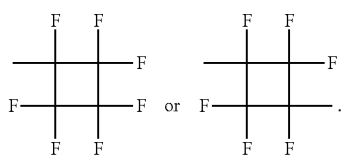

In a particular refinement, the ion conducting polymer includes a polymer having the following formula:

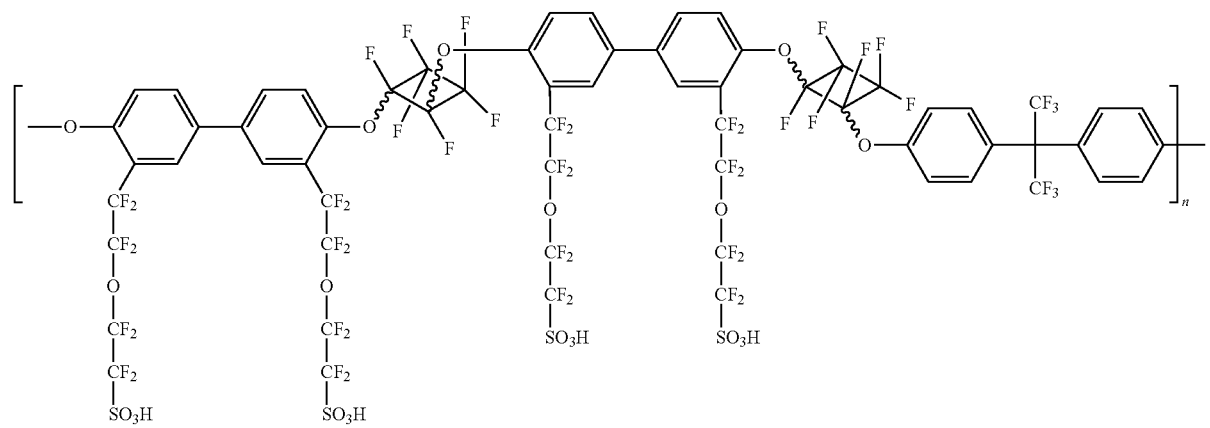

wherein n is from about 10 to about 10,000. It should be appreciated that the stereochemistry about the perfluorocyclobutane ring is only representative because the orientation can be cis or trans or 1,2- or 1,3-substitution of aryloxy-groups. It should also be appreciated that polymers with pendant side chains as set forth above are important in the preparation of high-performance catalyst fibers by electrospinning a mixture of PFCB ionomer with platinum on carbon catalyst materials (e.g., Tanaka). Loadings of platinum are typically between 0.1 and 0.4 mg Pt/cm² of surface area. These mixtures are electrospun onto membrane or carbon fiber diffusion medium and then the composite is assembled into a fuel cell as shown in FIG. 4.

In another embodiment of the present invention, the polymeric solution includes a fluoro-elastomer or fluoro-rubber. The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic groups. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution.

Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex® and Solvay Solexis under the trade names Solef® and Technoflon®, from 3M under the trade name Dyneon®, and from DuPont under the trade name Viton®. For example, Kynar Flex 2751 is a useful copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reactions after being blended with an ion-conducting polymer that includes a perfluorocyclobutyl moiety.

In another variation of this embodiment, the fluorinated polymer solution includes a perfluorosulfonic acid polymer (PFSA). In a refinement, such PFSAs are a copolymer containing a polymerization unit based on a perfluorovinyl compound represented by:

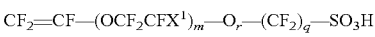

where m represents an integer of from 0 to 3, q represents an integer of from 1 to 12, r represents 0 or 1, and $X^1$ represents a fluorine atom or a trifluoromethyl group and a polymerization unit based on tetrafluoroethylene.

A sheet of nano-fibers of main-chain or side-chain sulfonated poly(perfluorocyclobutane) (PFCBs) homopolymers, block copolymers, or sulfonated PFCBs with Kynar blends are electrospun from DMF, DMAc, alcohol, or organic solutions at the concentration of 15-25 wt % by an electrospinning apparatus. Polymer solution is pumped out of a syringe at a predetermined speed where the needle potential is fixed at 10-14 kV and the needle-to-collector substrate distance is 8-10 cm. The electrospun mats are mechanically compacted to increase the fiber density. Nanofibers in a densified mat are welded at fiber intersection points by exposing them to the solvent vapor for 10-20 minutes. Densified and welded fiber mats are then optionally backfilled with a second polymer phase (i.e. Kynar, Nafion, etc.) to provide extra mechanical integrity or other properties, such as proton conduction.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a device with a fibrous sheet, the method comprising:
   providing a solution comprising a fluorinated polymer;
   forming an aggregation of fibers, the aggregation of fibers formed by electrospinning the solution of a fluorinated ion conducting polymer;
   forming the fibrous sheet from the aggregation of fibers;
   mechanically compacting the fibrous sheet to increase fiber density;
   welding fibers together at fiber intersection points by exposing the fibers to a solvent vapor; and
   interposing the fibrous sheet between an anode and a cathode.

2. The method of claim 1 wherein the anode and cathode are battery components and the fibrous sheet is a battery separator.

3. The method of claim 1 further comprising placing the fibrous sheet between a catalyst layer and a bipolar metal plate wherein the fibrous sheet is a gas diffusion layer.

4. The method of claim 1 wherein the fluorinated polymer comprises a polymer having perfluorocyclobutyl moieties.

5. The method of claim 4 wherein the fluorinated polymer includes pendant side chains.

6. The method of claim 4 wherein the perfluorocyclobutyl moieties are:

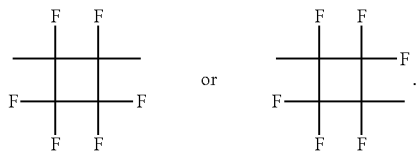

7. The method of claim 4 wherein the fluorinated polymer comprises polymer segments 1 and 2:

[E$_1$(SO$_2$X)$_d$]-P$_1$-Q$_1$-P$_2$     1

E$_2$-P$_3$-Q$_2$-P$_4$     2 wherein:
E$_1$(SO$_2$X)$_d$ is a sulfonated aromatic-containing moiety;
E$_1$ is an aromatic-containing moiety;
E$_2$ is an unsulfonated aromatic-containing and/or aliphatic-containing moiety;
X is an —OH, a halogen, an ester, or

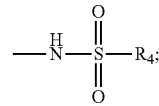

d is the number of (SO$_2$X)$_d$ attached to E$_1$;
P$_1$, P$_2$, P$_3$, P$_4$ are each independently: absent, —O—, —S—, —SO—, —CO—, —SO$_2$—, —NR$_1$H—, or NR$_2$—;
R$_2$ is C$_{1-25}$ alkyl;
R$_4$ is trifluoromethyl, or C$_{1-25}$ alkyl trifluoromethyl; and
Q$_1$, Q$_2$ are each independently a fluorinated cyclobutyl moiety.

8. The method of claim 4 wherein the fluorinated polymer comprises polymer segments 3 and 4:

E$_1$—P$_1$—Q$_1$—P$_2$     3
|
R$_8$(SO$_3$X)$_d$

E$_2$—P$_3$—Q$_2$—P$_4$     4 wherein:
E$_1$, E$_2$ are each independently an aromatic-containing and/or aliphatic-containing moiety;
X is an —OH, a halogen, an ester, or

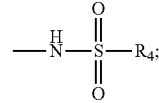

d is the number of (SO$_2$X)$_d$ attached to E$_1$;
P$_1$, P$_2$, P$_3$, P$_4$ are each independently: absent, —O—, —S—, —SO—, —CO—, —SO$_2$—, —NH—, or NR$_2$—;
R$_2$ is C$_{1-25}$ alkyl;
R$_4$ is trifluoromethyl, or C$_{1-25}$ alkyl, trifluoromethyl;
R$_8$(SO$_2$X)$_d$ is a sulfonated aliphatic or an aromatic-containing moiety; and
Q$_1$, Q$_2$ are each independently a fluorinated cyclobutyl moiety.

9. The method of claim 4 wherein the fluorinated polymer comprises polymer segments 5 and 6:

E$_1$(SO$_2$X)$_d$-P$_1$-Q$_1$-P$_2$     5

E$_2$-P$_3$-Q$_2$-P$_4$     6 connected by a linking group L$_1$ to form polymer units 7 and 8:

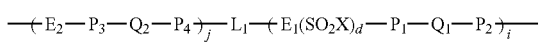

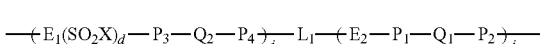

wherein:
E$_1$(SO$_2$X)$_d$ is a sulfonated aromatic-containing moiety;
E$_2$ is an unsulfonated aromatic-containing and/or aliphatic-containing moiety;

X is an —OH, a halogen, an ester, or

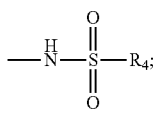

d is a number of (SO$_2$X) functional groups attached to E$_1$;
P$_1$, P$_2$, P$_3$, P$_4$ are each independently absent, —O—, —S—, —SO—, —SO$_2$—, —CO—, —NH—, or NR$_2$—;
R$_2$ is C$_{1-25}$ alkyl;
R$_4$ is trifluoromethyl, or C$_{1-25}$ alkyl trifluoromethyl;
Q$_1$, Q$_2$ are each independently a fluorinated cyclobutyl moiety;
i is a number representing repetition of polymer segment 5; and,
j is a number representing repetition of a polymer segment 6.

10. The method of claim 4 wherein the fluorinated polymer comprises polymer segments 9 and 10:

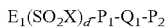   9

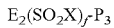   10 wherein:
E$_1$, E$_2$ is an aromatic or aliphatic-containing moiety wherein at least one of E$_1$ and E$_2$ include an aromatic group substituted with —SO$_2$X;
X is an —OH, a halogen, an ester, or

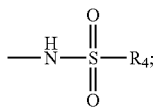

d is the number of (SO$_2$X) functional groups attached to E$_1$;
f is the number of (SO$_2$X) functional groups attached to E$_2$;
P$_1$, P$_2$, P$_3$ are each independently absent, —O—, —S—, —SO—, —SO$_2$—, —CO—, —NH—, or NR$_2$—;
R$_2$ is C$_{1-25}$ alkyl;

R$_4$ is trifluoromethyl, or C$_{1-25}$ alkyl trifluoromethyl; and
Q$_1$ is a fluorinated cyclobutyl moiety,
with the proviso that when d is greater than zero, f is zero and when f is greater than zero d is zero.

11. The method of claim 1 wherein the fluorinated polymer comprises a perfluorosulfonic acid polymer.

12. The method of claim 1 wherein the fluorinated polymer comprises a copolymer containing a polymerization unit based on a perfluorovinyl compound represented by:

CF$_2$=CF—(OCF$_2$CFX$^1$)$_m$—O$_r$—(CF$_2$)$_q$—SO$_3$H where m represents an integer of from 0 to 3, q represents an integer of from 1 to 12, r represents 0 or 1, and X$^1$ represents a fluorine atom or a trifluoromethyl group and a polymerization unit based on tetrafluoroethylene.

13. The method of claim 1 wherein the solution further comprises a fluoro-elastomer or a fluoro-rubber.

14. The method of claim 1 wherein fibers have an average width from about 5 nanometers to about 10 microns.

15. The method of claim 1 wherein the fibers have an average width from about 10 nanometers to about 5 microns.

16. The method of claim 1 wherein the fluorinated polymer comprises a sulfonated or unsulfonated ion-conducting polymer having perfluorocyclobutyl moieties.

17. A fibrous sheet made by a method comprising:
providing a solution comprising a fluorinated polymer;
forming an aggregation of fibers, the aggregation of fibers formed by electrospinning the solution of a fluorinated ion conducting polymer;
forming the fibrous sheet from the aggregation of fibers;
mechanically compacting the fibrous sheet to increase fiber density;
welding fibers together at fiber intersection points by exposing the fibers to a solvent vapor; and
interposing the fibrous sheet between an anode and a cathode.

18. The fibrous sheet of claim 17 wherein the fluorinated polymer comprises a component selected from the group consisting of a polymer having perfluorocyclobutyl moieties, a perfluorosulfonic acid polymer, and combinations thereof.

19. The fibrous sheet of claim 17 wherein the solution further comprises a fluoro-elastomer or a fluoro-rubber.

20. The method of claim 1 wherein the fluorinated polymer has the following formula:

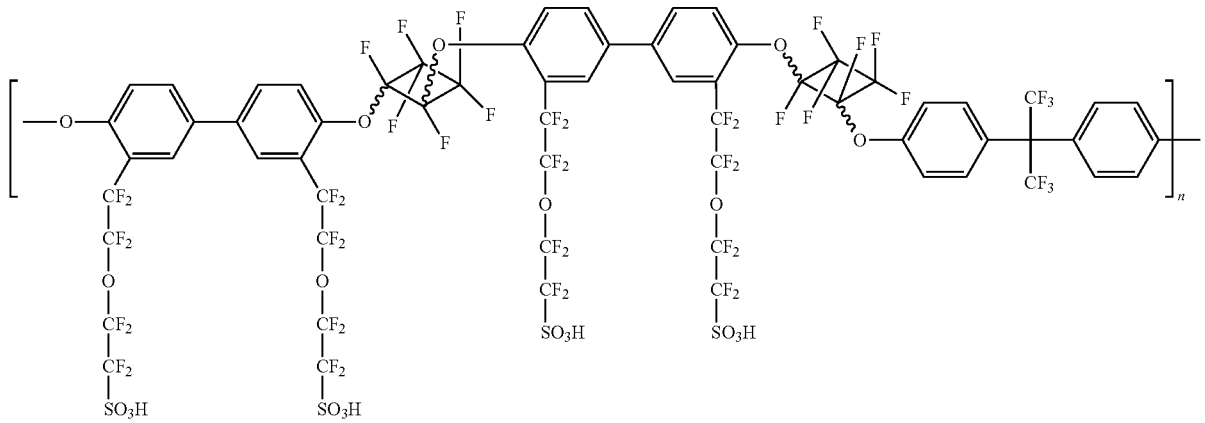

wherein n is from about 10 to about 10,000.

* * * * *